(12) United States Patent
Wadström

(10) Patent No.: US 8,303,180 B2
(45) Date of Patent: Nov. 6, 2012

(54) TEMPERATURE RECORDER

(76) Inventor: Petra Wadström, Åkersberga (SE)

( * ) Notice: Subject to any disclaimer, the term of this patent is extended or adjusted under 35 U.S.C. 154(b) by 700 days.

(21) Appl. No.: 12/516,806

(22) PCT Filed: Nov. 30, 2007

(86) PCT No.: PCT/SE2007/001068
§ 371 (c)(1),
(2), (4) Date: May 29, 2009

(87) PCT Pub. No.: WO2008/066462
PCT Pub. Date: Jun. 5, 2008

(65) Prior Publication Data
US 2010/0067561 A1    Mar. 18, 2010

(30) Foreign Application Priority Data

Nov. 30, 2006   (SE) .................................... 0602562-1

(51) Int. Cl.
| | |
|---|---|
| G01K 5/70 | (2006.01) |
| G01K 5/44 | (2006.01) |
| G01K 5/50 | (2006.01) |
| G01K 5/62 | (2006.01) |
| G01K 5/64 | (2006.01) |

(52) U.S. Cl. ........ 374/205; 374/100; 374/160; 374/163; 374/186; 374/187; 116/216; 116/221

(58) Field of Classification Search .......... 374/100–105, 374/109, 141, 159, 55, 186, 187, 205–20, 374/149, 160, 205–208, 163; 116/216, 221

See application file for complete search history.

(56) References Cited

U.S. PATENT DOCUMENTS

| | | | | |
|---|---|---|---|---|
| 4,064,827 | A | * | 12/1977 | Darringer et al. ............. 116/221 |
| 4,091,763 | A | * | 5/1978 | Snider ............................ 116/221 |
| 4,311,049 | A | * | 1/1982 | La Passo et al. .............. 374/207 |
| 5,143,453 | A | * | 9/1992 | Weynant ....................... 374/205 |
| 5,537,950 | A | | 7/1996 | Ou-Yang |
| 5,735,607 | A | * | 4/1998 | Shahinpoor et al. .......... 374/187 |
| 6,837,620 | B2 | * | 1/2005 | Shahinpoor ................... 374/205 |

(Continued)

FOREIGN PATENT DOCUMENTS

CH       677 030 A5    3/1991

(Continued)

*Primary Examiner* — Gail Verbitsky
(74) *Attorney, Agent, or Firm* — Dickstein Shapiro LLP

(57) ABSTRACT

A temperature recorder in the form of a tubular cover and with an inside piston, in which an altered position of the piston is carried out by a mechanical movement released from a bimetal washer, which, when making a sudden change, changes its form from convex to concave when a determined temperature level is reached. Two line-formed screen patterns, a picture formed by colored lines on the inner surface of the tubular cover, shows a certain pattern in the original position, and a different pattern is shown when an inside piston has been moved vertically inside the outer tubular cover. Friction between the outside of the piston and the inner surface of the tubular cover forms a braking means. A reset button can by means of a magnet or a spring repulse or press back the piston which is in the top of the tubular cover and has a magnet and the piston will be pressed back within the tubular cover to its original position and the first patterns will be shown clearly again by the line-formed screen pattern. The bimetal washer will assume its original form and is prepared to start again when the temperature is increased or decreased.

11 Claims, 2 Drawing Sheets

U.S. PATENT DOCUMENTS

| | | | |
|---|---|---|---|
| 6,848,390 B2 * | 2/2005 | Akers et al. | 116/216 |
| 7,048,730 B2 * | 5/2006 | Petrakis | 604/890.1 |
| 7,287,485 B2 * | 10/2007 | Petrakis | 116/216 |
| 7,387,438 B2 * | 6/2008 | Parker | 374/160 |
| 7,415,939 B2 * | 8/2008 | Dip | 116/216 |
| 7,455,668 B2 * | 11/2008 | Petrakis | 604/890.1 |
| 7,578,617 B2 * | 8/2009 | Zhang et al. | 374/178 |
| 7,607,402 B2 * | 10/2009 | Petrakis | 116/216 |
| 2005/0105587 A1 * | 5/2005 | Shahinpoor | 374/205 |
| 2008/0106365 A1 * | 5/2008 | Li et al. | 337/401 |
| 2008/0215037 A1 * | 9/2008 | Petrakis | 604/890.1 |

FOREIGN PATENT DOCUMENTS

| | | |
|---|---|---|
| DE | 197 29 685 A1 | 1/1998 |
| GB | 2 040 050 A | 8/1980 |
| GB | 2 315 126 A | 1/1998 |
| JP | 63223535 A * | 9/1988 |
| JP | 02161343 A * | 6/1990 |
| JP | 2002-156285 A | 5/2002 |

* cited by examiner

TEMPERATURE RECORDER

TECHNICAL AREA

A temperature recorder, which does not need any external energy, which optically signals and marks the wanted level of temperature with a screen movement, being released by a bimetal.

BACKGROUND

There is a need of a simple, clear resettable temperature recorder including a memory capacity, which recorder can be used among others together with different kinds of water purifying processes. A temperature recorder which indicates that the maximum and minimum temperature, respectively, is reached.

FIELDS OF APPLICATION

A mechanical temperature recorder, having a memory capacity (in order to show that a specific temperature is reached) and with a reset function, can be used within several fields where there is shortage of electricity, batteries and other advanced and expensive equipment.

Clarity means: A marking which is easy to understand even for those not being able to read and for handicapped and weak-sighted persons. A simple symbolic marking is carried out with the aid of a screen pattern technique by that the temperature recorder shows on its outside either a "sad red man" or a "happy green man", which thus functions without specific knowledge of languages.

The temperature recorder can advantageously be used when measuring the temperature of water, liquids, gases and food.

The temperature recorder can be used in different microbiological water purifying processes as pasteurization of water, where water temperatures are to be heated to 60° Celcius.

The temperature recorder shows a "sad red man" until the water temperature has exceeded x centigrades. When this occurs the recorder alters to show a "happy green man", which indication thereafter remains (this thus being the memory function of the mechanical system) until the restoring button again is pressed and the temperature simultaneously is considerably lower than x centigrades (hysteresis value).

When using this temperature recorder it is thus not necessary to observe the increase in temperature in order to notice that the desired temperature is reached.

My invention differs from temperature recorders disclosed in previous patents but the closest is U.S. Pat. No. 4,649,854, Over-temperature indicator device for freezer, which is based on a movement being released by a bimetal and which is shown with a position alteration by gravitation. Said patent is also intended for a different field of application. U.S. Pat. No. 3,452,706, U.S. Pat. No. 2,362,424, EP0363728, U.S. Pat. No. 4,091,763 disclose apparatuses from which my invention differs.

DESCRIPTION

A temperature recorder which is in the form of a pipe, tubular cover or a rectangular box is manufactured in a transparent glass or plastic material.

A circular mechanical pre-stressed bimetallic washer is placed at one end of the pipe, the tubular cover, the box, which washer is designed to change at x centigrades the desired temperature) and thus having required hysteresis.

Hysteresis means the direction dependant temperature difference which is between the change and the return of the shape of the bimetal. By the spring characteristics the bimetal is provided with such a function that its change of shape occurs suddenly by a certain positive reverse coupling.

The bimetal washer is designed as a circular plate with a diameter of e.g. 12.7 mm and having such a pre-stressing that it is convex in relation to the reference side. At a sudden change of the bimetal its shape is changed to a concave shape within a millisecond. When the temperature has dropped according to the hysteresis the bimetal will return again to the original convex shape. This can occur quite repeatedly without jeopardizing the operation.

The circular bimetal washer is placed in a suitable shaped seat in a thermally well conductive material, e.g. aluminium. In this way the washer can be brought to change without being touched, simultaneously as e.g. the water temperature is conducted to the bimetal washer, which means a short delay of the higher temperature from, for instance, the water which is heated. The temperature x centigrades is chosen in dependence on the purification function, e.g. 60 centigrades. The bimetal washer is fixed in a certain position in the tubular cover in which only the pre-determined movement from convex to concave form can be performed.

Inside the tubular cover a piston is placed in the form of a rod, a pipe or a rectangular box, which can run inside the tubular cover. A certain friction is needed in order to prevent the piston from moving out of its position due to influence from the outside. The outside of the piston and the inner side of the tubular cover shall together constitute a braking means.

The piston has a screen pattern of lines, which cover the surface of the piston, completely or partly. This screen pattern can show a picture formed by lines in colour and/or in shape on half of the screen pattern and with face difference of one line, a different picture of lines and/or colour on the second part of a screen pattern. Also other screen pattern solutions having a sharp optical marking and/or change of colours are possible. A screen pattern, coloured lines on a transparent bottom, is arranged on the inner side of the tubular cover. A basic picture is shown in the starting position for the indication of the temperature. For instance a sad mouth in a red-striped face. The change of shape of the bimetal washer will push the piston upwards in the pipe to a fixed stop level when a predetermined temperature is reached, and this should clearly be marked by way of changing the form of a picture and/or changing the colour of a picture. For instance a happy mouth in a green-striped face. When the temperature recorder has this clear optical readable signal, it shows that the desired temperature is reached. The piston will stay in this position by means of the braking means.

The screen pattern function means that both the "sad man" and the "happy man" are traced in each other with screen pattern separation such that for each relative shift of one covering screen pattern a change occurs between the two indications. By the screen patterns being so close to each other the sensitivity towards a parallax distortion is low.

The screen pattern function is maintained by careful definition of the two turning positions of the moveable piston. By an interior carrier being provided with a chosen elasticity between the bimetal washer and the piston, the movement will always be the same, corresponding to the width of the screen pattern, for instance 0.5 mm. The amplitude of the sudden change is somewhat greater, e.g. 0.8 mm.

A magnet is fixed to the upper end of the piston.

A magnet is also fixed on the reset button.

When the reset button on the upper part of the pipe is pressed the magnet on the piston and the magnet on the button will act repulsively against each other and the piston will hereby be pressed backwardly to its initial position. In this way the temperature recorder can be set to 0, where after the temperature recorder again can be used. Another solution for resetting ability to 0 is e.g. to use a spring function.

In order to carry out the reset-operation there is a need for a liquid-proof transmission, as well as a reset-spring action in order to secure the mechanical rest position of the reset-button. These two actions are achieved according to what is said above with a permanent magnet coupling between two small, preferably circular permanent magnets, which are positioned opposite each other with the same polarity. The inner magnet is inside the hermetically closed housing within which also the indication screen pattern and the bimetal are placed, which thus efficiently are protected against liquid, rust etc.

By the repelling force of the two magnets, said spring force is obtained keeping the reset-button in its resting position and also the force being needed to push the screen pattern to its stand-by position ("sad man"). When the temperature has reached x centigrades the bimetal washer changes, whereby the screen pattern moves to the opposite indication ("happy man").

Provided that the temperature again is lower than x centigrades plus the hysteresis value, a repeated pressing of the reset-button will once again set the relative screen pattern position to 0, which means the indication "sad man".

The temperature recorder can easily be applied e.g. on different receptacles by using threads, gluing or fixing the recorder permanently in another way, or to be used flexibly a loop can be fixed around the pipe for easier handling, reading.

SPECIFIC DESCRIPTION WITH REFERENCE TO THE DRAWINGS

Figures 1, 2, 3:
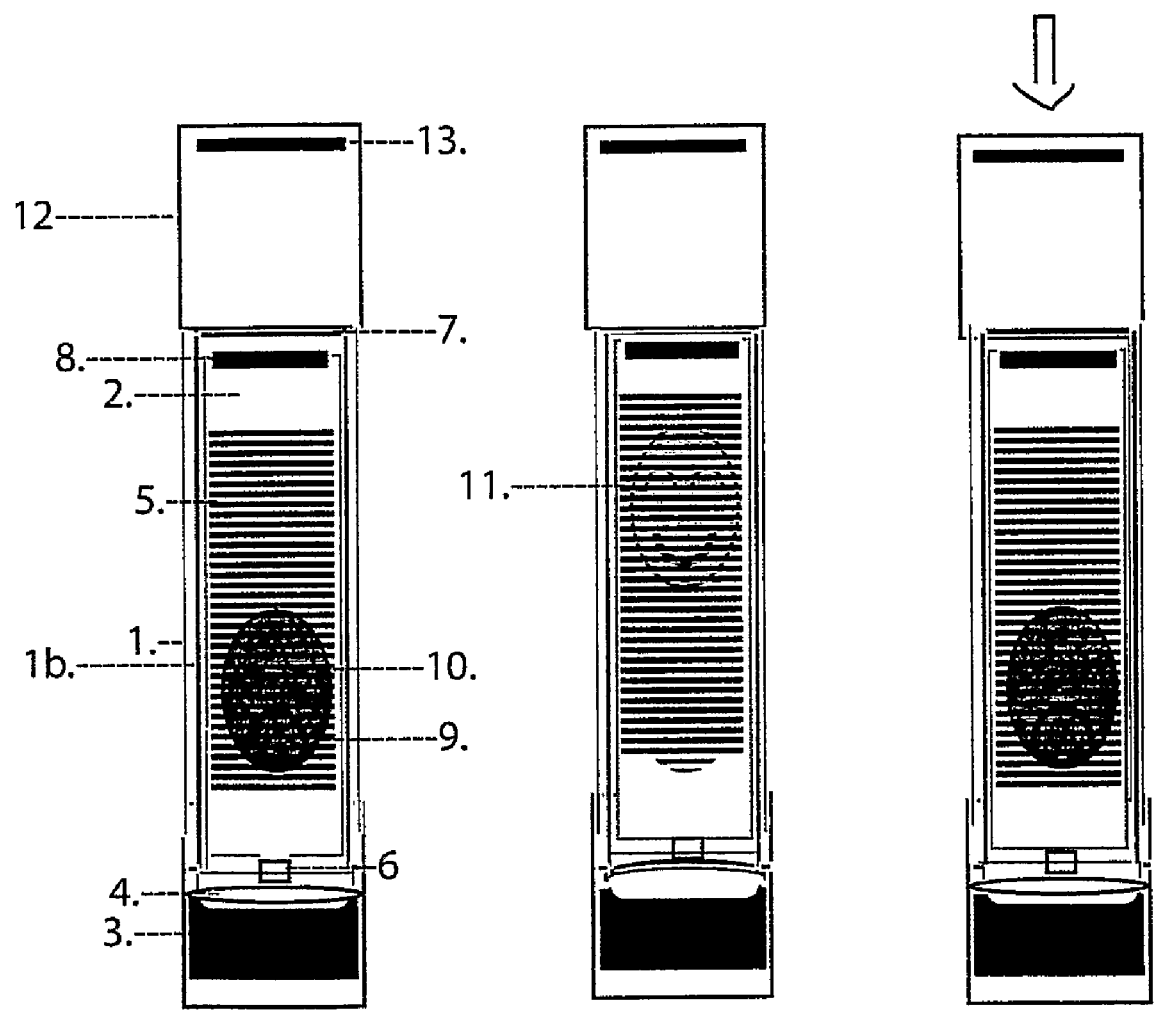
FIGS. 1-3 show a first embodiment of the temperature recorder in three different positions of the piston.

The temperature recorder consists of a cylindrical transparent pipe, tubular cover or box 1 having an inside piston 2 in the form of a rod or a pipe, which runs within the exterior tubular cover. A thermally conductive seat 3 is placed at the bottom of the tubular cover 1 and is preferably made from aluminium.

A bimetal washer having a determined range of temperature changes (by hysteresis settled sudden change) 4 is fixed in the seat of aluminium 3. A screen pattern 5 is formed on the inner wall of the exterior tubular cover 1b in the form of an even number of horizontal lines, preferably being coloured with a transparent margin between them. This screen pattern reaches from the bottom of the tubular cover to the top and preferably covering the entire inner wall 1b of the tubular cover.

A follower pin 6 will be hit by the bimetal washer 4 when it changes its form from convex to concave at a given temperature. The piston 2 will then be pushed vertically (by the pin) to a determined level, the movement hereby being stopped by a lid 7.

The diameter of the piston is so adapted to the diameter of the tubular cover that there is a certain friction when the piston is moved within the tubular cover, this friction being a braking means for the piston (inertia) which means that the piston does not change its position when the temperature recorder is shaken or hit by a stroke. A cylinder shaped magnet 8 is fixed on the upper end of the piston. A screen pattern 9 is formed on the surface of the piston with horizontal lines with a face displacement in the middle of the screen pattern. This screen pattern consists of horizontal lines having preferably two different colours and/or two different pictures formed by lines on a white or different coloured bottom. This is a colour which differs from the two inside screen patterns.

When the bimetal washer changes its form at the given temperature, a vertical movement of the piston will be released and from a screen pattern picture 10 shown in the original position on half of the screen pattern surface, a new picture is now shown on the other screen pattern surface 11. The piston will reach a stop level by the lid 7.

In order to reset the piston with the screen pattern picture 11 visible, a button 12 is pressed. This button 12 has also a magnet within the upper part 13 of its lid. When this button 12 is pressed the magnets will repel each other so that the piston 2 with the screen pattern picture 10 again reaches its original position.

Figure 4:
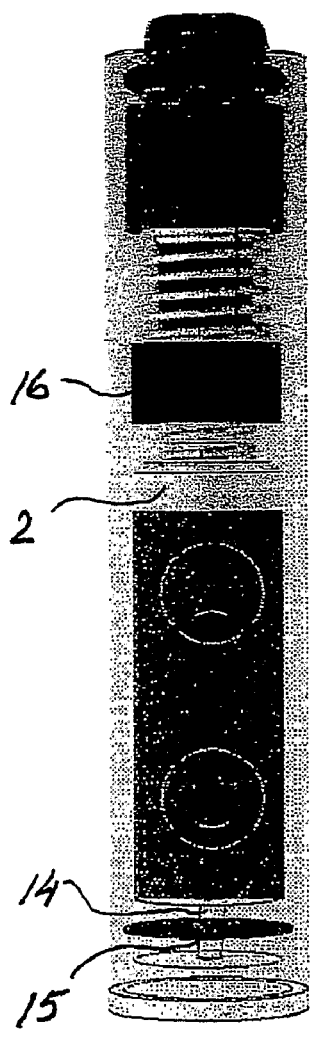
FIGS. 4-6 show a second embodiment in the same way.
Figure 5:
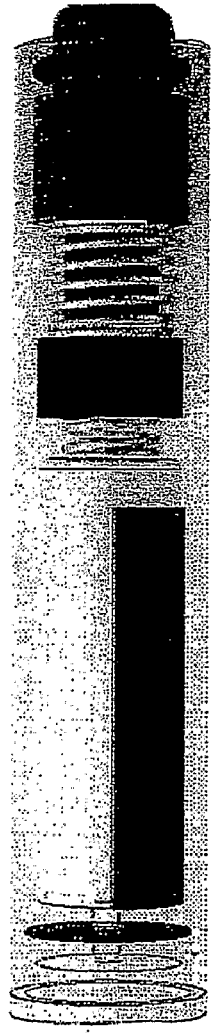
Figure 6:
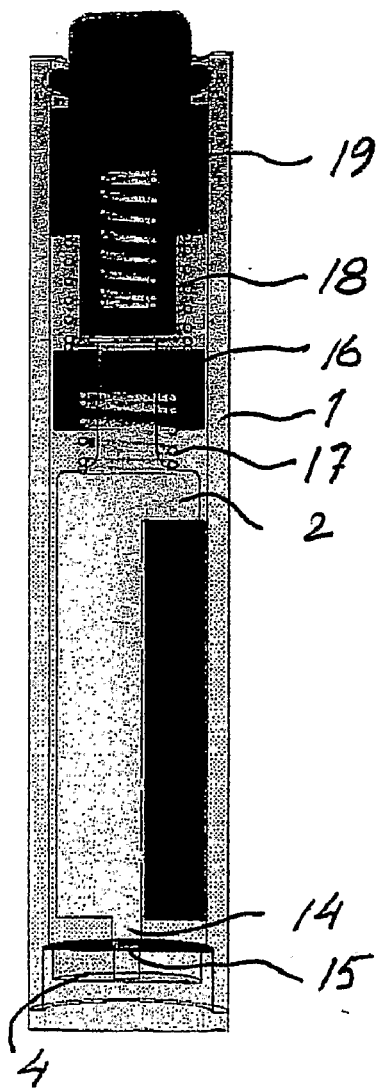

FIGS. 4-6 show a second embodiment of the invention in three different phases. The phases are the same as those shown in FIGS. 1-3. Parts, which completely correspond to the embodiment according to FIGS. 1-3, are indicated by the same numerals. From FIG. 6 it can specifically be seen how the piston 2 is fastened to the bimetal 4. The piston has a pin 14 directed downwards from the underside of the piston, which pin is extended into a hole 15 of the bimetal 4. The pin 14 can be fixed in the hole 15 in a suitable way or it can run freely in the hole 15. In the latter case the upper side of the bimetal will abut a support (not shown) on the pin 14 so that the bimetal will push the piston 2 upwards when it changes its form.

Further there is a lid 16 in the tubular cover 1 which limits the highest position of the piston in the tubular cover 1. Hereby the piston 2 is pressed with its upper end against the lid 16 via a spring 17. There is a button 19 in the upper end of the tubular cover 1, which button can be pressed downwards against a spring 18. The springs 17 and 18 are preferably so balanced that there is equilibrium between those springs when the piston 2 has reached its uppermost position caused by the force from the change of form of the bimetal. When the bimetal is to return to its original form, the button 19 is pressed and the piston is returned to its original position. This embodiment uses a bimetal means which has a great hysteresis, that means that the temperature difference between the sudden change temperature and the return temperature is considerable. Preferably the return temperature, that is the temperature when the bimetal returns to its original form, is lower than the lowest temperature in the surroundings during the use of the temperature recorder. It is hereby secured that the piston will be returned by manual operation of the button 19.

Within the spirit of the invention as it is stated in claim 1 there are further embodiments specifically concerning the limitation of the stroke of the piston, means for returning the piston, the form of the bimetal and abutment against the underside of the piston and the form of the button.

The invention claimed is:

1. Temperature recorder for measuring the temperature of a medium including a bimetal means (4), which changes its form when the temperature is changed, which change of form is registered, whereby wherein the bimetal means is placed in one end of a tubular cover (1), which end is turned against the medium when the temperature is measured, that a piston (2) is arranged within the tubular cover being moveable to and from within the tubular cover (1), wherein the end of the piston (2) which is turned to the bimetal means (4) will abut the bimetal means and will be pushed by this when the form is changed, wherein the force from the change of form thus will overcome opposite forces including the weight of the piston and friction forces between the piston and the tubular cover, characterized in that the tubular cover (1) is transparent and furnished at least partly with a screen pattern (5) and that the piston (2) is furnished with a second screen pattern (9) which cooperates with said first screen pattern, so that when the piston (2) reaches a certain position by the change of form of the bimetal (4), a specific pattern (11) will be formed by the two screen patterns, wherein the specific pattern is a pattern indicative of the measured temperature.

2. Temperature recorder according to claim 1, characterized in that the bimetal means (4) is a washer, which changes its form from convex to concave, when seen from the tubular cover (1), when the temperature is raised.

3. Temperature recorder according to claim 1, characterized in by reset means (12, 13; 19) for the piston (2) in order to return it to the original position.

4. Temperature recorder according to claim 3, characterized in that a magnet (8) is placed in the second end of the piston (2) in relation to the position of the bimetal means (4), and that a second magnet (13) is placed in the end of the tubular cover which is turned to said first magnet (8), wherein the plus ends or the negative ends of the magnets are turned towards each other, so that when the second magnet (13) is moved towards the magnet (8) of the piston, the piston (2) is displaced to the original position by the repelling action of the magnets.

5. Temperature recorder according to claim 1, characterized in that a catch hook is arranged swingable through the wall of the tubular cover and cooperating with transversal marks or bars being arranged on the outside of the piston.

6. Temperature recorder according to claim 1, characterized in that the bimetal means is arranged in a suitable formed seat (3), which is of a thermally conductive material, for instance aluminum.

7. Temperature recorder according to claim 1, characterized in that a lid (7) determines the upward movement of the piston by hitting the lid.

8. Temperature recorder according to claim 1, characterized in that the piston (2) and the bimetal means (4) are joined together by means of a pin (14), which is fixed to the end of the piston (2) which is turned to the bimetal means (4) and that there is a hole (15) through the bimetal means.

9. Temperature recorder according to claim 7, characterized in that the lid (16) abuts the piston (2) via a spring (17) on one end and abuts a second spring (18) on the other end, which spring abuts a button (19) which is displaceable in the direction towards the lid, wherein the opposite spring forces of the two springs is balanced so that the balance between them corresponds to the set position for the piston when the bimetal changes its form.

10. Temperature recorder according to claim 9, characterized in that the button (19) is used for resetting the piston (2) by the button being pressed in the direction towards the piston.

11. Temperature recorder according to claim 3, characterized in that the temperature of the bimetal means for returning to its original form is lower than ambient temperature when the recorder is used so that the return of the bimetal must be carried out by action of a user.

\* \* \* \* \*